United States Patent [19]

Heimbuch

[11] Patent Number: 4,669,096
[45] Date of Patent: May 26, 1987

[54] DIFFERENTIAL DATA LINE SELECTOR

[76] Inventor: William G. Heimbuch, 4285 Gate Crest, San Antonio, Tex. 78217

[21] Appl. No.: 696,349

[22] Filed: Jan. 30, 1985

Related U.S. Application Data

[63] Continuation-in-part of Ser. No. 650,897, Sep. 17, 1984, abandoned.

[51] Int. Cl.$^4$ .............................................. H04B 7/10
[52] U.S. Cl. .................................... 375/100; 455/277; 328/154
[58] Field of Search .................. 375/100, 40; 455/277, 455/343, 133, 136; 328/58, 69, 75, 104, 154

[56] References Cited

U.S. PATENT DOCUMENTS

| | | | |
|---|---|---|---|
| 3,041,539 | 6/1962 | Parker | 455/277 |
| 3,596,107 | 7/1971 | Kittrell | 328/154 |
| 3,896,383 | 7/1975 | Bilotti et al. | 455/343 |
| 4,109,280 | 8/1978 | Dash | 455/277 |
| 4,449,248 | 5/1984 | Leslie et al. | 455/343 |

FOREIGN PATENT DOCUMENTS 0086229  6/1980  Japan .................................. 455/227

Primary Examiner—Robert L. Griffin
Assistant Examiner—M. Huseman
Attorney, Agent, or Firm—Richard C. Litman

[57] ABSTRACT

An electronic switching circuit for providing solid state switching of a plurality of incoming radio frequency information channels, with the circuit providing a pulse processor for altering the timing of the incoming channels, comparator/integrator circuitry for redefining the pulse width of the incoming channels with reference to a standard voltage level, level translator circuitry for further redefining the input channel level, and radio frequency selection gates for error-free discrimination and selection among the incoming channels.

5 Claims, 9 Drawing Figures

DIFFERENTIAL DATA LINE SELECTOR

RELATED APPLICATIONS

This application is a continuation-in-part of application Ser. No. 06/650,897 filed Sept. 17, 1984, now abandoned.

BACKGROUND OF THE INVENTION

1. Field of the Invention

This invention relates to a refinement in the art of electronic switching of multiple electromagnetic carrier information channels, including digital or other selection modes. More specifically, this device allows selection of a single electromagnetic information channel from an available plurality of channels each carrying serial data, these channels being in the radio frequency domain from approximately 1 KHz to 40 GHz.

2. Description of the Prior Art

In the past, two methods have been utilized to provide selection or switching of a plurality of channels in the microwave frequency range, such that one channel is allowed to pass, and all other channels are blocked: the first is the use of PIN diodes, and the second is the use of comparator logic circuits as bias voltage generators to bias semiconductor switching devices, such as transistors.

Both of these methods have attendant disadvantages commonly known to those skilled in the art, which disadvantages are abated or eliminated by the subject invention.

SUMMARY OF THE INVENTION

This invention relates to an improved method for discriminating among two or more incoming signal channels, providing circuitry for discriminating among these channels, and selecting one channel to be received by an output line, while blocking all others from said output line. The invention combines the prior art circuitry of PIN diode switching device and comparator logic circuits to provide improved performance in an electronic switch for microwave channels or the like. The incoming channels are presented to the switching circuit simultaneously, and said channels are differentiated by means of pulse width discrimination or voltage iteration to accentuate the differences between said incoming channels, thus allowing precise selection of the desired channel over other undesired channels. Other features include totally solid state design with no moving parts, and improved distribution of power within the switching circuit itself.

DESCRIPTION OF THE PREFERRED EMBODIMENT

Figure 1:
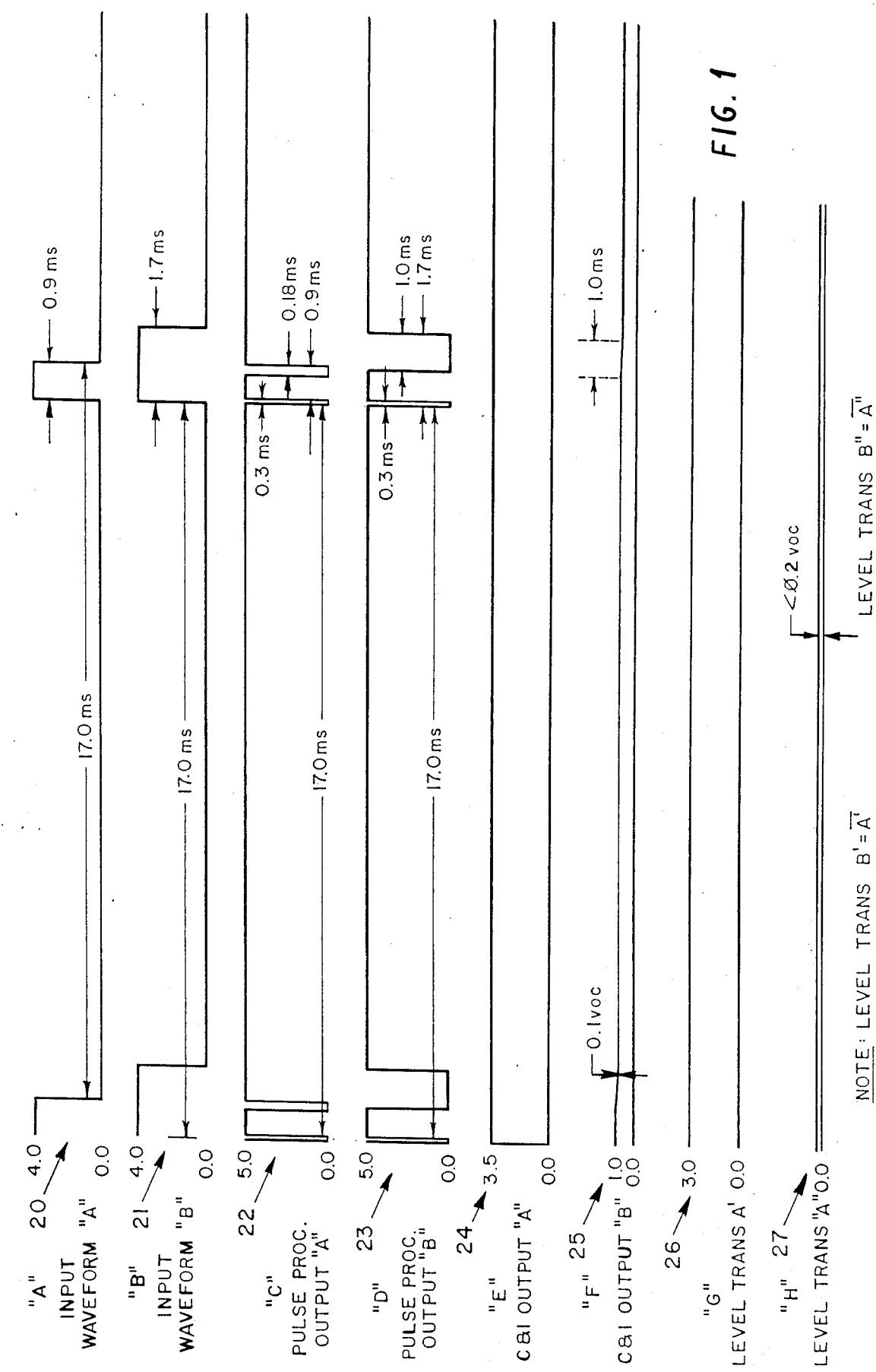
FIG. 1 illustrates the various waveforms produced by the individual sections of the inventive circuitry.
Figure 2:
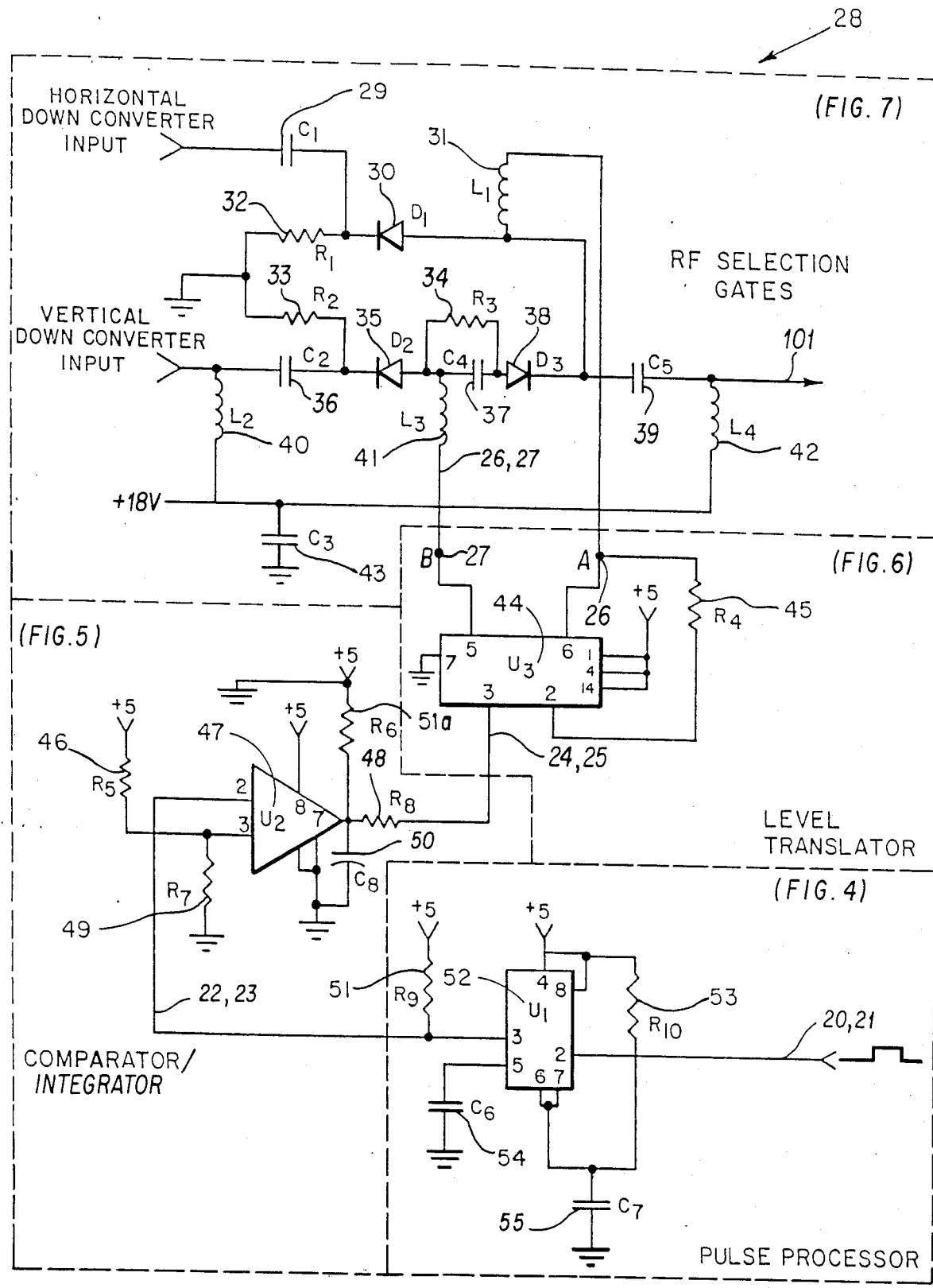
FIG. 2 represents a schematic overview of the interconnection of the various sections including FIGS. 4–7 of the invention.
Figure 3:
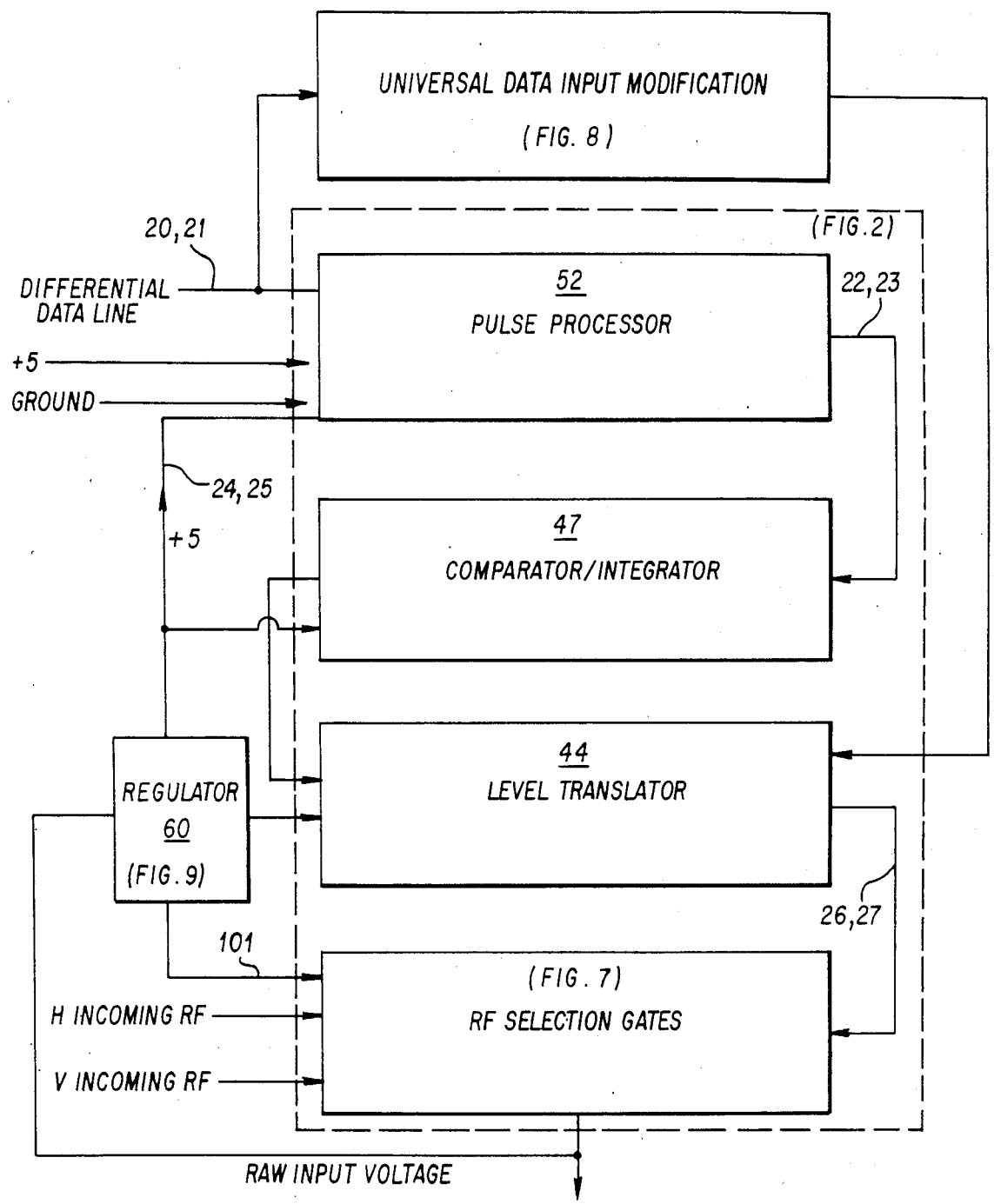
FIG. 3 shows a block diagram of the basic interconnection of the various sections including FIG. 2 and FIGS. 4–9 of the invention.

Referring to the drawings generally and particularly with the waveforms of FIG. 1 and the block circuitry of FIGS. 2 and 3, the operation of the circuit in its entirety is described briefly. Incoming waveforms from two channels A and B are shown as waveforms 20, 21, differing only in pulsewidth. These signals 20, 21 are applied directly to pulse processor 52, which alters the timing intervals between the two channels being received to produce output waveforms 22 and 23. These waveforms are applied to comparator/integrator circuit 47, and are further defined as waveforms 24, 25, both having been compared to a reference waveform level, resulting in outputs which significantly differ one from the other. Additional processing by level transistor circuit 44 further separates the discrimination levels of the waveforms, resulting in waveforms 26, 27. These signals are then applied to the RF selection gates of FIG. 7, which then readily discriminates between the two incoming channels H and V without error. Selection of the desired channel is made by selective biasing of the PIN diodes of the selection gate, and said desired channel is passed to the output port 101 of the overall switching circuit.

The differential data line selector 10 is a pulse width discriminating radio frequency switch designed to select between two incoming radio frequency ports H and V dependent upon the pulse width or voltage iteration of the incoming signal pattern.

Figure 7:
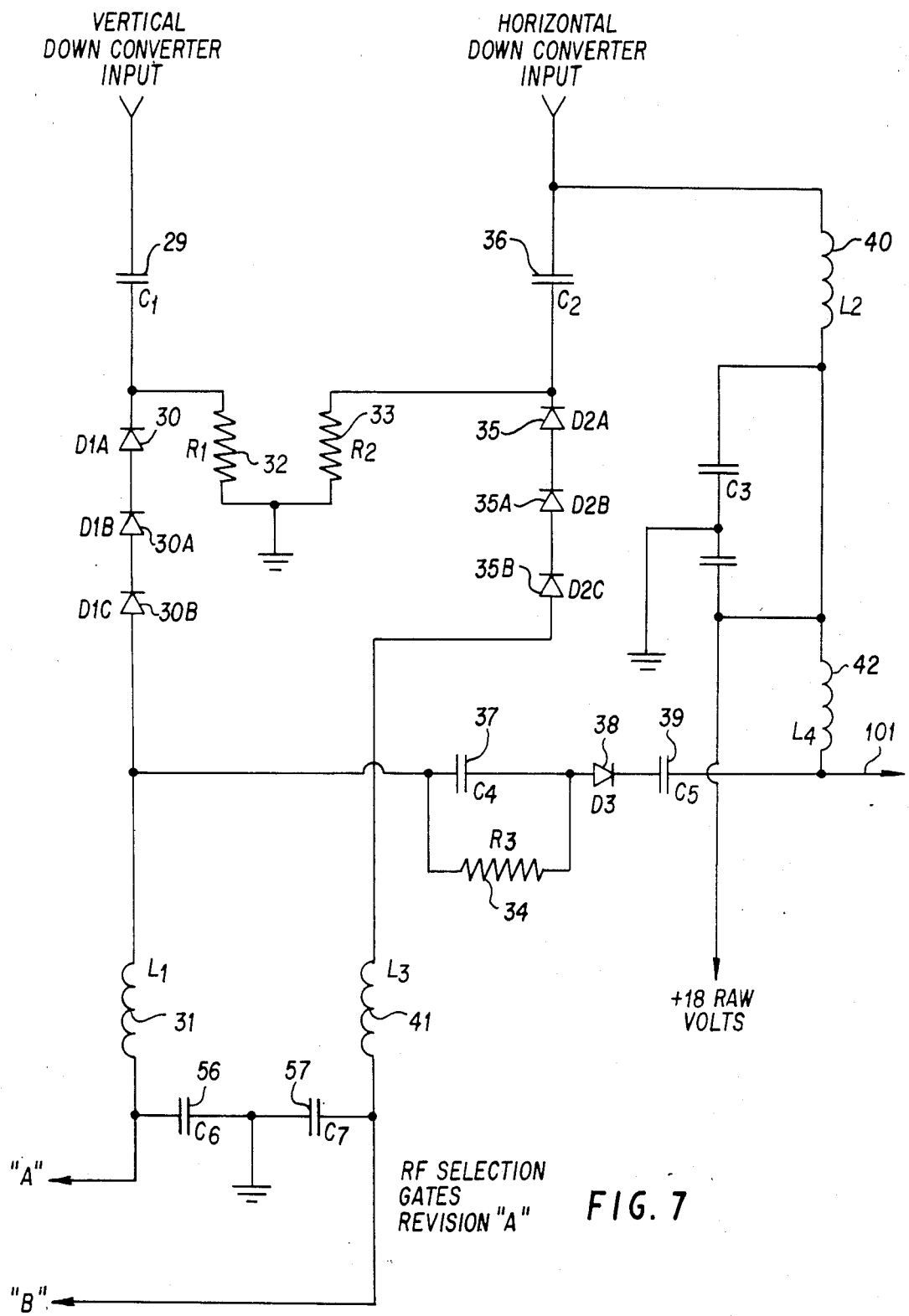
FIG. 7 shows the details of the RF selection gate section of the invention.
Figure 8:
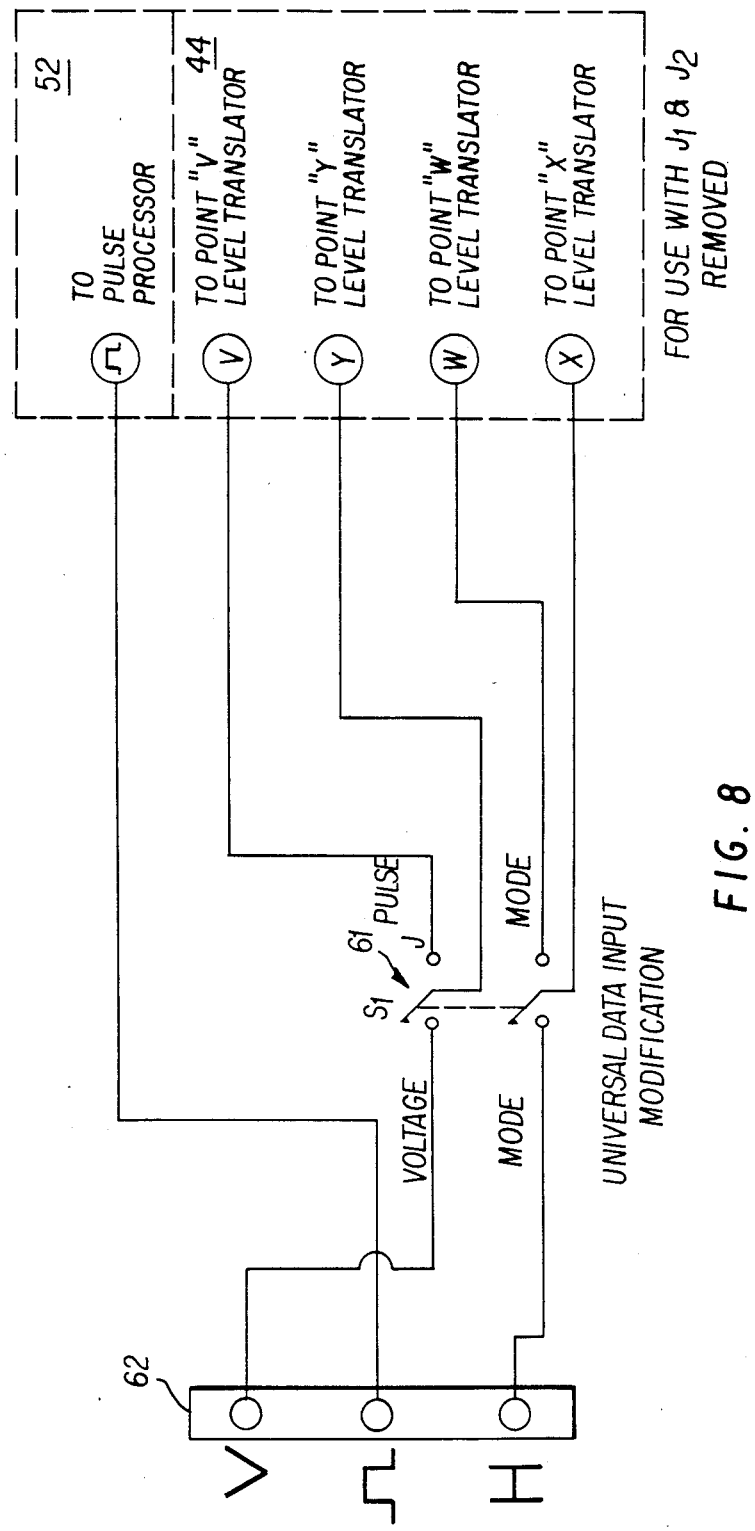
FIG. 8 shows the details of the universal data input modification of the invention.

The selector 10 is divided into six major sections:
(1) Pulse Processor 52;
(2) Comparator/Integrator 47;
(3) Level Translator 44;
(4) RF Selection Gate (FIG. 7);
(5) Voltage Regulator (FIG. 9); and
(6) Universal Data Input Modification Circuit (FIG. 8).

Figure 4:
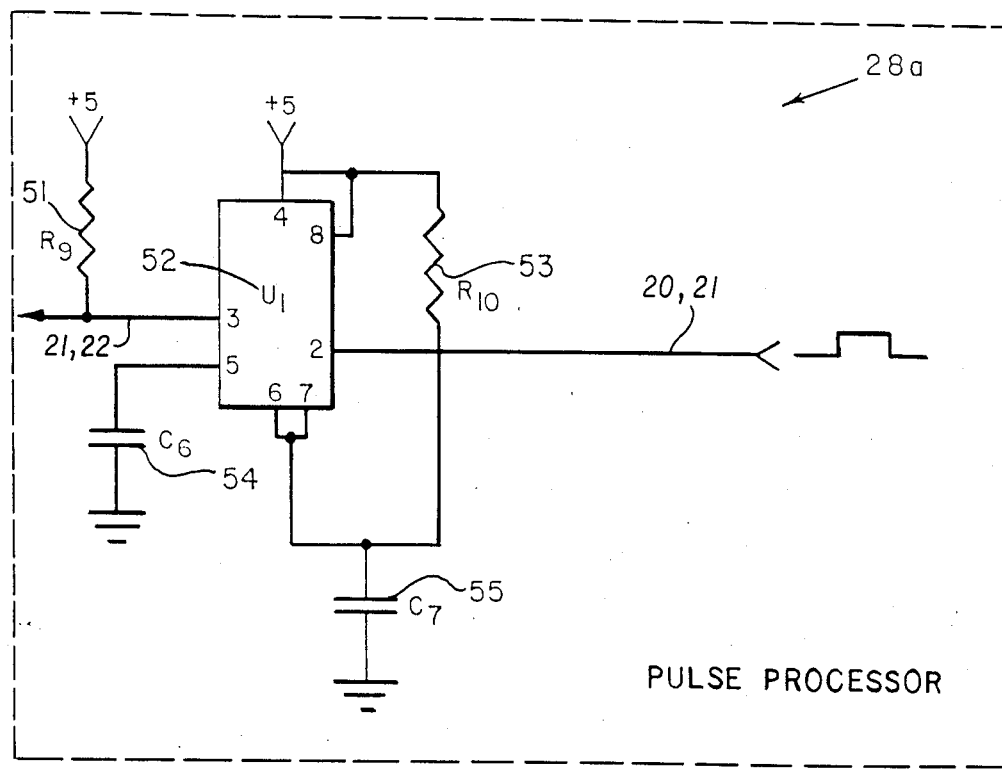
FIG. 4 shows the details of the pulse processor section of the invention.

The pulse processor 52 utilizes a standard timer circuit, such as model MC1455 manufactured by Motorola Semiconductor, Inc., and shown in detail in FIGS. 2, 3 and 4. The RC network of said timer defines the time difference between the incoming data channels, and increasing the time interval between the incoming serial data by a factor of 4 or more. Referring to FIG. 1, waveforms 20 and 21 illustrate two incoming signal channels, while waveforms 22 and 23 show the resulting outputs of timer circuit 52. Referring back to FIGS. 2 and 4, the pulse processor includes timer circuit 52 and RC network 53 and 55 for defining the timing interval between incoming channels. Capacitor 54 is for refinement of the timing of circuit 52. The serial data input trains 20, 21 arrive at pin #2 of circuit 52, and provide output waveforms 22, 23 at pin #3. Resistor 51 is used to pull up the output pin of timing circuit 52, while the voltage applied to pin #4 insures that timer 52 will not be reset. Typical values of the elements in FIG. 4 are listed below:

TABLE I

| | | |
|---|---|---|
| Resistor | 51 | 1.5K ± 5% ¼ watt carbon film |

TABLE I-continued

| Timer | 52 | MC1455 (Motorola Semiconductor, Inc.) |
|---|---|---|
| Resistor | 53 | 300K to 500K ¼ watt carbon film |
| Capacitor | 54 | 0.01 microfarad ± 20% ceramic disc |
| Capacitor | 55 | 0.01 microfarad ± 20% ceramic disc |

Figure 5:
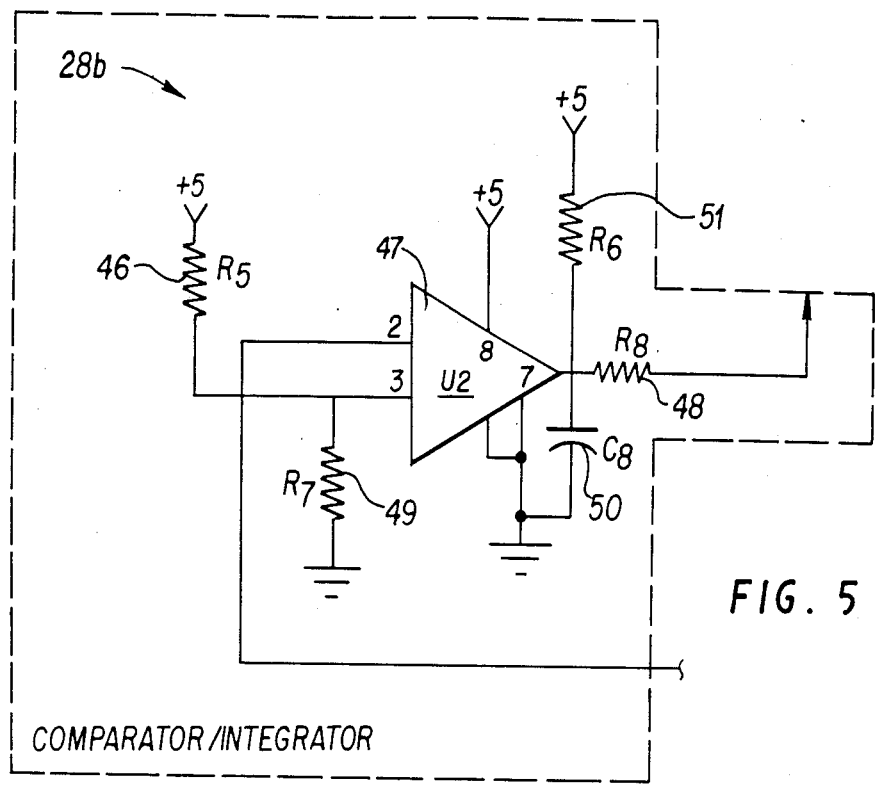
FIG. 5 shows the details of the comparator/integrator section of the invention.

The comparator/integrator section 47 of the invention is shown in FIG. 5. It provides for further differentiation between input channels following the timing changes resulting from pulse processor 52. The output waveform 22, 23 of pulse processor is applied to the non-inverting input of the comparator 47 at pin #2, and a fixed reference voltage derived from the voltage divider created by resistors 46 and 49 is applied to the inverting input of the comparator at pin #3. The point of comparison as defined by the inverting input reference equals the RMS value of the processor output waveform 22, 23 as adjusted by the output timing. For pulse processor output signal waveform 22 from FIG. 1, this RMS value is below the reference voltage, and for the output level of waveform 23, the RMS voltage is above this reference voltage. Since the comparator 47 has a hysteresis region greater than the difference between the waveforms 22 and 23, random output pulses could have an objectionable effect on circuit operation. These random pulses are filtered and integrated through capacitor 50 in FIG. 5, therefore deriving a comparator output 24, 25 which can be defined within the constraints of TTL logic definitions. Referring again to FIG. 1, the further defined outputs 24 and 25 illustrate the improved definition between the two incoming channels after processing by the comparator/integrator circuit 47. Resistor 51a pulls up the output of said comparator/integrator circuit 47, while resistor 48 matches said output to the level translator section of the device. Typical electrical values for the elements of this section are listed below:

TABLE II

| Resistor | 46 | 10K ± 5% ¼ watt carbon film |
|---|---|---|
| Resistor | 48 | 10K ± 5% ¼ watt carbon film |
| Resistor | 49 | 470 ± 5% ¼ watt carbon film |
| Capacitor | 50 | 470 micro farrad ± 20% electrolytic 6 vdc |
| Resistor | 51a | 1K ± 5% ¼ watt carbon film |
| Comparator/Integrator | 47 | LM311 Comparator (Motorola Semiconductor, Inc.) |

Figure 6:
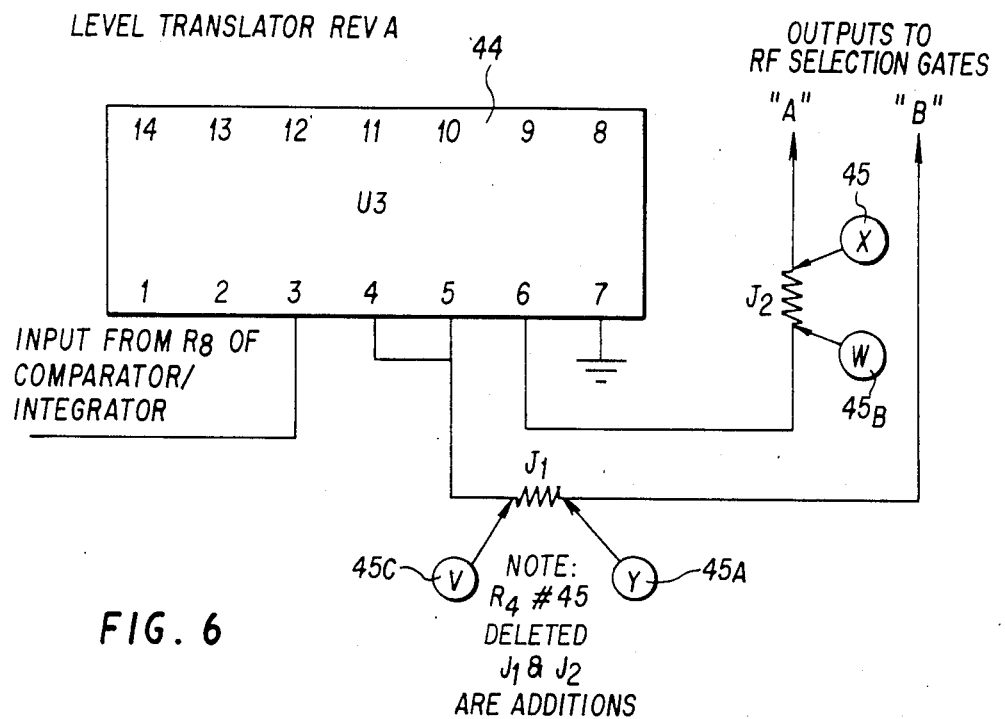
FIG. 6 shows the details of the level translator section of the invention.

Level translator 44, shown in FIG. 2 and in greater detail in FIG. 6, is a hex inverter for translation of the comparator/integrator output signal 25, 26. This output signal 25, 26 is applied to the input of the first inversion stage of the inverter 44 at pin #3, which input is inverted 180° and applied simultaneously to one RF selection gate (FIG. 7) and to the next hex inversion stage of inverter 44. The output of this second inversion stage is again 180° inverted and also applied to the RF selection gates of FIG. 7. The net result is two signals A and B applied to the RF selection gates of FIG. 7, whose polarity is always 180° out of phase. Referring back to FIG. 1, the results of processing by the level translator 44 further discriminates between the inputted waveforms 24 and 25, producing simultaneous outputs at pins 5 and 6 (FIG. 6) as shown in waveforms 26 and 27 i.e., B and A, respectively. Typical electrical values for this section are listed below:

TABLE III

| Level Transistor | 44 | SN7404 Hex Inverter |
|---|---|---|

TABLE III-continued

| Resistors | 45 | J₁ & J₂ consisting of approx. ½" #22 AWG copper/nickel wire |
|---|---|---|

The RF selection gates illustrated in FIGS. 2 and 7 consist of a series of biased PIN diodes to select the desired channel from among the incoming channels, and apply said desired channel to the output port 101 for reception. The selection process is independent of the DC path provided between the output port and RF input port #2. Outputs from pins #5 and #6 (FIG. 6) of the level translator 44 are applied through radio frequency chokes 31 and 41, respectively, to the anodes of PIN diode arrays 30 and 35, shown in detail in FIG. 7. Paired resistors 32 and 33 act as bias current paths to ground for each port. Capacitors 29, 36, 37 and 39 block DC bias current from the input and output apparatus. PIN diode 38 is used in a steering configuration for RF port #1, or 101 and is biased through resistor 34. Inductors 40 and 42 block RF currents from entering the DC signal path between RF port 101 #2 and the RF output port while capacitors 43, 54 and 55 bypass stray RF currents to ground. The biasing system for the PIN diodes, dependent upon the pulse processing section, selects an RF path which is wholly dependent upon the time relationship between the two differing data signal channels input to the device. That is, a pulse width common to a certain incoming data channel will be made to select a known RF input port, and a differing input data train will select the other RF input port. Typical electrical values for this section are listed below:

TABLE IV

| Capacitor | 29 | 100 pico farad NPO Ceramic ± 10% 50 vdc chip |
|---|---|---|
| PIN Diodes | 30ABC | IN5767 |
| Choke | 31 | 10 micro henry ⅛ w ± 10% hermetically sealed |
| Resistor | 32 | 1K ± 5% ¼ w carbon film |
| Resistor | 33 | 1K ± 5% ¼ w carbon film |
| Resistor | 34 | 1K ± 5% ¼ w carbon film |
| PIN Diodes | 35ABC | IN5767 |
| Capacitor | 36 | 100 pico farad NPO Ceramic ± 10% 50 vdc chip |
| Capacitor | 37 | 100 pico farad NPO Ceramic ± 10% 50 vdc chip |
| PIN Diode | 38 | IN5767 |
| Capacitor | 39 | 100 pico farad NPO Ceramic ± 10% 50 vdc chip |
| Choke | 40 | 100 micro henry ⅛ w ± 10% hermetically sealed |
| Choke | 41 | 100 micro henry ⅛ w ± 10% hermetically sealed |
| Choke | 42 | 100 micro henry ⅛ w ± 10% hermetically sealed |
| Capacitor | 43 | .01 pf ± 20% 50 vdc ceramic disc |
| Capacitor | 43A | .01 pf ± 20% 50 vdc ceramic disc |
| Capacitor | 56 | .01 pf ± 20% 50 vdc ceramic disc |
| Capacitor | 57 | .01 pf ± 20% 50 vdc ceramic disc |

The universal data input modification circuit (FIG. 8) is a second configuration of the extraneous input wiring arranged in such a way as to render the invention useful for differing types of incoming input data. The circuit utilizes a three-position input terminal block 62 ad double pole double throw switch 61 to accomplish direct biasing of the PIN diode arrays of the FIG. 7 for RF energy selection. Referring to FIG. 8, non-differential data from an input source such as a satellite receiver as manufactured M/A Com, Inc., is applied to input terminals V and H of terminal block 62. These input terminals are connected through toggle switch 61 for distributing said non-differential data to the common connection point of level translator 44 shown in FIG. 6. Thus, both differential and non-differential data are properly applied to level translator 44 for proper processing of both signal types.

Figure 9:
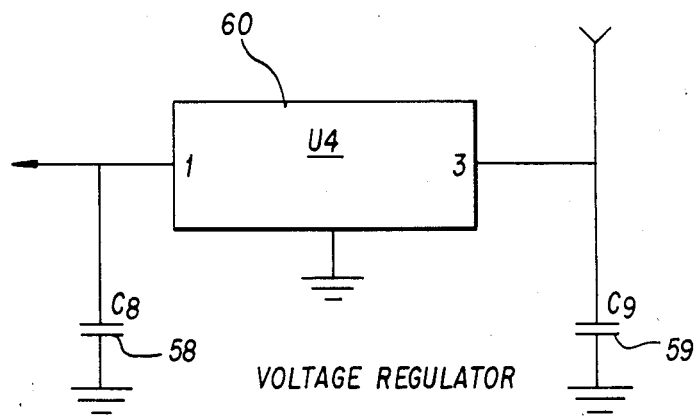
FIG. 9 shows the details of the voltage regulator improvement section of the invention.

A second improvement to the basic differential data line selector 10 is the inclusion of the voltage regulator 60 shown in FIGS. 3 and 9. This circuit is added for the purpose of refining incoming raw voltage fed to the switching circuit through the RF output port for powering of the different circuit sections previously described. Referring to FIG. 7, the incoming raw voltage is passed through choke 42 to RF output port 101, and thence to pin #1 of the regulator circuit. Capacitors 58 and 59 shown in FIG. 9 are parasitic suppressors to keep the regulator free of oscillation. Operating voltage for the sections of the invention is distributed from pin #3 of the regulator circuit 60. Typical electrical values for this section are listed below:

TABLE V

| Voltage Regulator | 60 | MC7805TC (Motorola Semiconductor, Inc.) |
|---|---|---|
| Capacitor | 58 | .1 micro farad 50 v ± 20% ceramic disc |
| Capacitor | 59 | .01 micro farad 50 v ± 20% ceramic disc |

Operation of the circuit in its entirey is described briefly below, with particular reference to the waveforms of FIG. 1. Incoming waveforms from two channels A and B are shown as waveforms 20 and 21, differing only in pulse width. These signals are applied directly to pulse processor 52, which alters the timing intervals between the two channels being received to produce output waveforms 22 and 23. These waveforms ae applied to comparator/integrator circuit 47, and are further redefined as waveforms 24 and 25, both having been compared to a reference waveform level, resulting in outputs which significantly differ one from the other. Additional processing by level translator circuit 44 further separates the discrimination levels of the waveforms, resulting in waveforms 26 and 27. These signals are then applied to the RF selection gates of FIG. 7, which can then readily discriminate between the two incoming channels without error. Selection of the desired channel is made by selective biasing of the PIN diodes of the RF selection gate, and said desired channel is passed to the output port of the overall switching circuit.

The circuitry and operation described above as that of the preferred embodiment, is merely exemplary of the basic operation of the circuit concept, and is not meant to be limiting to the scope of the invention.

I claim:

1. In a radio frequency communication system wherein a plurality of microwave information-carrying channels are received simultaneously by a single receiver, an electronic switching circuit for selecting one of said plurality of incoming channels for processing by said receiver, said switching circuit comprised of: means for defining each of said incoming channel signals, said defining means altering both the amplitude and pulse shape of serial data being received on each of said plurality of incoming channels; means for differentiating each of said incoming channels by increasing the spacing between the defining pulses of said serial data being received on each of said plurality of incoming channels by a factor of four or more; and comparator means and integrator means adapted to respond to the pulses shapes resulting from said defining and differentiating means in such a manner as to clearly distinguish between each of said incoming channels, thus allowing precise selection of a desired channel over an undesired channel by a standard radio frequency selection gate of the PIN diode array type, said receiver further comprising a means for allowing universal data input of both differential and non-differential data to said electronic switching circuit, said means for allowing including a three-position terminal block and double pole double throw switch to allow direct biasing of said PIN diode array for control of the radio frequency energy selection characteristics of said array.

2. The apparatus of claims 1 wherein further there is an integrated circuit voltage regulator within said electronic switching circuit for refining of the incoming raw voltage signal utilized to power all functions of said switching circuit.

3. In a radio frequency communication system wherein a plurality of microwave information-carrying channels are received simultaneously by a single receiver, an electronic switching circuit for selecting one of said plurality of incoming channels for processing by said receiver, said switching circuit comprised of: means for defining each of said incoming channel signals, said defining means altering both the amplitude and pulse shape of serial data being received on each of said plurality of incoming channels; means for differentiating each of said incoming channels by increasing the spacing between the defined pulses of said serial data being received on each of said plurality of incoming channels by a factor of four or more; and comparator means and integrator means adapted to respond to the pulse shapes resulting from said defining and differentiating means in such a manner as to clearly distinguish between each of said incoming channels, thus allowing precise selection of a desired channel over an undesired channel by a standard radio frequency selection gate of the PIN diode array type, said receiver further comprising of an integrated circuit voltage regulator within said electronic switching circuit for refining an incoming raw voltage signal utilized to power all functions of said switching circuit.

4. The apparatus of claim 3 wherein further there is a means for allowing universal data input of both differential and non-differential data to said electronic switching circuit.

5. The apparatus of claims 3 wherein further there is means including a three-position block and double pole double throw switch to allow direct biasing of said PIN diode array for control of the radio frequency energy selection characteristics of said array.

* * * * *